May 30, 1939.  D. L. McNEAL  2,160,208
SPEED CONTROLLED BRAKE
Filed July 24, 1937
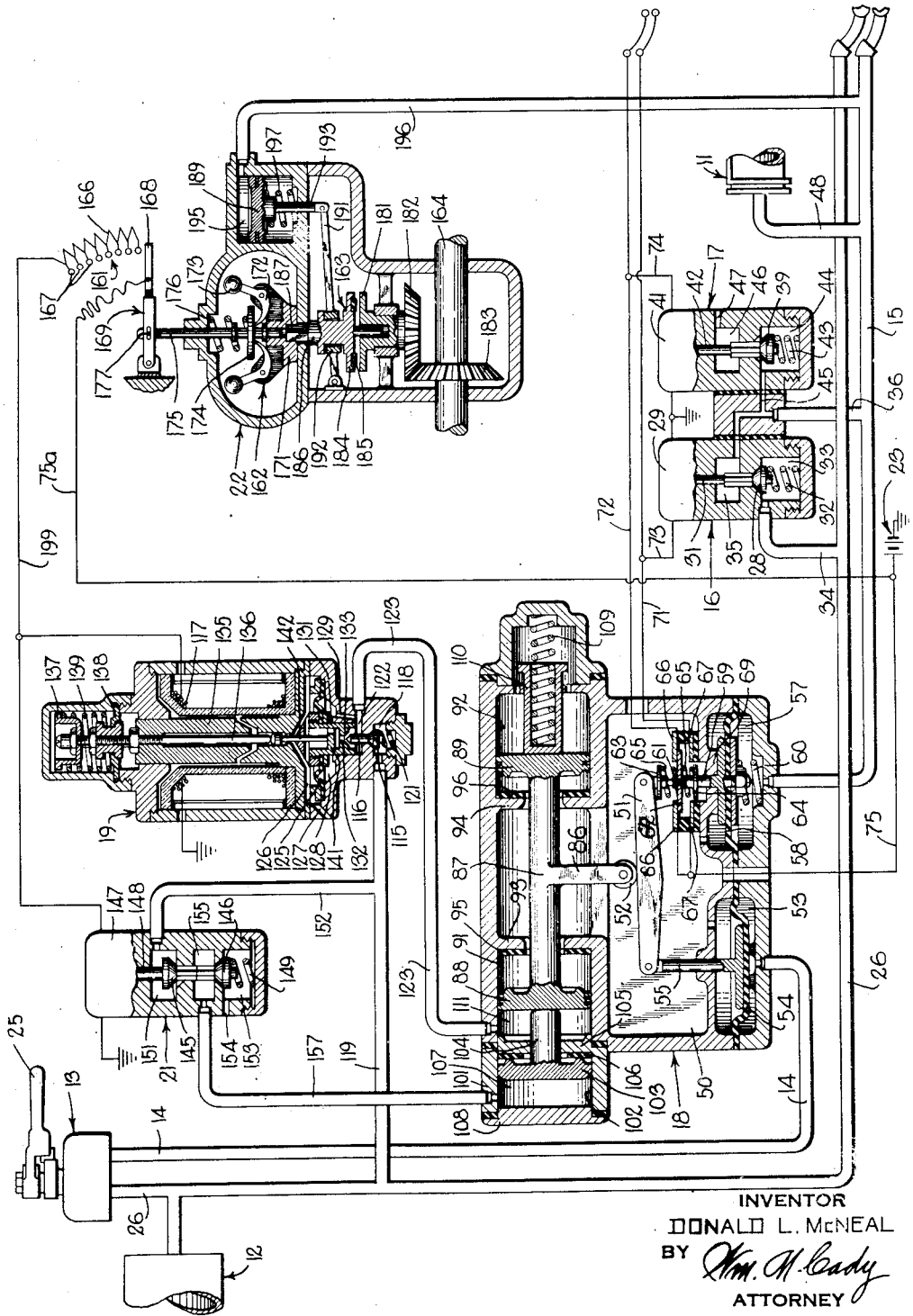
INVENTOR
DONALD L. McNEAL
BY Wm. M. Cady
ATTORNEY Patented May 30, 1939

2,160,208

UNITED STATES PATENT OFFICE 2,160,208

SPEED CONTROLLED BRAKE

Donald L. McNeal, Wilkinsburg, Pa., assignor to The Westinghouse Air Brake Company, Wilmerding, Pa., a corporation of Pennsylvania Application July 24, 1937, Serial No. 155,452

10 Claims. (Cl. 303—21)

This invention relates to speed-controlled brakes, that is, to vehicle brake systems in which the degree of application of the brakes is automatically controlled according to the speed of the vehicle.

In the copending application Serial No. 153,912 of Ellis E. Hewitt, filed July 16, 1937, and assigned to the same assignee as the present application, there is disclosed and claimed a speed-controlled brake equipment including a fluid-pressure-differential responsive device having a pivoted lever, subject to the opposing moments exerted by a control pressure and a supply pressure which determines the degree of application of the brakes, and operative to control the degree of the supply pressure in varying ratio to the control pressure dependent upon the position of a movable fulcrum for the pivoted lever. The movable fulcrum is shifted to different positions by a movable abutment which is shifted by variations in fluid pressure acting thereon, the variation in the fluid pressure being effected through the medium of a plurality of magnet valve devices which are controlled according to the speed of the vehicle.

It is an object of my present invention to provide a brake control equipment of the character disclosed in the above-mentioned copending application and having simplified means for varying the position of the movable fulcrum according to variations in the speed of the vehicle.

Another object of my invention is to provide electropneumatic means for varying the position of the movable fulcrum in a brake control equipment of the above-indicated character whereby the ratio between the supply pressure and the control pressure may be reduced to a minimum ratio as the speed of the vehicle reduces as long as the electrical control circuits do not fail or break due to accident, and including means for insuring a ratio between the supply pressure and control pressure higher than the minimum ratio so as to provide adequate braking of the vehicle or train in the event of failure or rupture of the electrical control circuits.

Another object of my invention is to provide a brake control equipment, of the character indicated in the foregoing objects, having electroresponsive devices controlled by a governor device operated according to the speed of the vehicle and including an arrangement for preventing consumption of power by the electroresponsive devices except during an application of the brakes.

Another object of my invention is to provide a brake control equipment of the character indicated in the foregoing objects and including a speed-governor-operated device having a clutch arrangement whereby the governor device is operated according to the speed of the vehicle only during an application of the brakes.

The above objects, and other objects of my invention which will be made apparent hereinafter, are attained by means of an illustrative embodiment of my invention shown in the single figure of the accompanying drawing and described hereinafter in detail.

DESCRIPTION OF EQUIPMENT

Referring to the single figure of the drawing, the equipment shown comprises a brake cylinder 11, a source of fluid pressure such as a main reservoir 12, a brake valve device 13, a control pipe 14 the fluid pressure in which is under the control of the brake valve device 13, a straight-air pipe 15 the fluid pressure in which controls or determines the fluid pressure in the brake cylinder 11, an application magnet valve device 16, a release magnet valve device 17, a control switch mechanism 18 for controlling the application and release magnet valve devices 16 and 17, a self-lapping magnet valve device 19 and a cut-off magnet valve device 21 for controlling the operation of the control valve mechanism 18, a speed-controlled or governor rheostat device 22 for controlling the self-lapping magnet valve device 19 and the cut-off magnet valve device 21, and a source of electrical energy such as a storage battery 23.

Considering the parts of the equipment in greater detail, the brake valve device 13 is illustratively shown as of a simple rotary type having a rotary valve, not shown, which is operated by a handle 25. The handle 25 is normally in a release or running position and is operative to a service application position, an emergency application position, and a lap position, in the well known manner of brake valve devices. With the handle 25 in release position, the rotary valve establishes communication whereby the control pipe 14 is connected to atmosphere. With the handle 25 in service application position, fluid under pressure is supplied from the main reservoir 12 through a pipe 26, hereinafter called the main reservoir pipe, to the control pipe 14 at a service rate. If it is desired to effect a service application of the brakes, the operator shifts the handle 25 to the service application position and when a pressure corresponding to the desired degree of braking force is established in the control pipe 14, shifts the handle to lap position, wherein communication between the main reservoir pipe 26 and the control pipe 14 is closed, as well as the communication between the control pipe and atmosphere, thus maintaining the established pressure in the control pipe 14.

If it is desired to effect an emergency application of the brakes, the operator turns the handle 25 to emergency position and thus causes communication to be established through which fluid under pressure is supplied from the main reservoir pipe 26 to the control pipe 14 at an emergency rate, the ultimate pressure obtained in the control pipe corresponding to the pressure of the fluid as supplied from the main reservoir. If desired, any suitable type of feed valve device may be provided whereby the maximum pressure established in the control pipe 14 in an emergency application of the brakes is limited to a pressure lower than the pressure in the main reservoir 12.

The application magnet valve device 15 comprises a supply valve 28 and an electro-magnet 29 effective, when energized, to actuate a plunger 31 to unseat the supply valve 28 from a normal seated position against the yielding resistance of a spring 32. The supply valve 28 is contained in a chamber 33 which is constantly connected to a source of fluid pressure, such as the main reservoir pipe 26, through a branch pipe and passage 34. When the electro-magnet 29 is energized and the supply valve 28 correspondingly unseated communication is established between the chamber 33 and a chamber 35 which is connected to the straight-air pipe 15 through a branch pipe and passage 36.

The release magnet valve device 17 comprises a release valve 39 and an electro-magnet 41 effective, when energized, to actuate a plunger 42 to unseat the release valve 39 from an associated valve seat against the yielding resistance of a coil spring 43. The release valve 39 is contained in a chamber 44 which is constantly connected, through a branch passage 45, to the passage and pipe 36 leading to the straight-air pipe 15. When the release valve 39 is unseated, it establishes communication between the chamber 44 and a chamber 46 which is constantly open to atmosphere through an exhaust port 47.

It will thus be apparent that when the release valve 39 is unseated and supply valve 28 is seated, in the manner shown in the drawing, straight-air pipe 15 and the brake cylinder 11, which is connected to the straight-air pipe 15 through a branch pipe 48, will be vented to atmosphere through the exhaust port 47 of the release magnet valve device 17. It will also be apparent that when the release valve 39 is seated and supply valve 28 is unseated, fluid under pressure is supplied from the main reservoir pipe 26 to the straight-air pipe 15 and brake cylinder 11.

The control switch mechanism 18 comprises a casing having a chamber 50 in which is contained a fluid-pressure-differential responsive device including a lever 51 pivotally movable on a movable fulcrum 52 and subject to the opposing moments exerted by the pressure in the control pipe 14 and the pressure in the straight-air pipe 15. As will be apparent in the drawing, the control pipe 14 is connected to a chamber 53 in the casing of the control switch mechanism 18 and the pressure in the chamber 53 acts on a diaphragm 54 for actuating a stem 55 pivotally connected to one end of the lever 51. In a similar manner, the straight-air pipe 15 is connected to a chamber 57, and the pressure in the chamber 57 acts on a diaphragm 58, preferably of the same effective pressure area as the diaphragm 54, for actuating a stem 59 which is pivotally connected to the opposite end of the lever 51.

Slidably carried on a reduced portion of the stem 59, as by an insulating bushing 61, is a contact-bridging member 62 which is resiliently held between two spaced collars or flanges 63 and 64, fixed to the stem 59, by two coil springs 65 interposed between the respective flanges and the contact bridging member.

Associated with contact-bridging member 62 are an upper pair of spaced insulated contact members 66 and a lower pair of spaced insulated contact members 67.

A coil spring 60, contained in the chamber 57 and interposed between the diaphragm 58 and the casing normally urges the diaphragm 58 upwardly into engagement with a stop lug or seat 69, in which position contact-bridging member 62 engages the pair of contact members 66 in circuit-closing relation. When the stem 59 is shifted downwardly against the resistance of the spring 60, contact-bridging member 62 disengages contact members 66 and, after a predetermined movement downwardly, engages the contact members 67 in circuit-closing contact.

Corresponding terminals of the electro-magnets 29 and 41 of the application and release magnet valve devices 16 and 17 are connected, respectively, to an application train wire 71 and a release train wire 72, through branch wires 73 and 74, respectively, the opposite terminals being both connected to one terminal of the battery 23 as through a ground connection in the manner shown, the grounded terminal of the battery 23 being hereinafter referred to as the negative terminal. The application train wire 71 is connected to one member of the pair of contact members 67 and the release train wire 72 is connected to one member of the pair of contact members 66, the remaining contact members 66 and 67 of each pair being connected to the positive terminal of the battery 23, as through a common wire 75.

It will thus be seen that when the contact-bridging member 62 engages the contact members 66, as shown in the drawing, the electro-magnet 41 of the release magnet valve device 17 is energized and the electro-magnet 29 of the application magnet valve device 16 is deenergized.

It will also be seen that when the contact bridging member 62 engages the contact members 67, the electro-magnet 29 of the application magnet valve device 16 is energized and the electro-magnet 41 of the release magnet valve device 17 is deenergized.

The fulcrum 52 for the lever 51 may be in the form of a roller, as shown, and is carried on a lateral projection or tongue 86 of a rod or shaft 87 which is slidably supported at the opposite ends thereof by two pistons 88 and 89 fixed thereto that operate in separate bores 91 and 92. At the inner end of the bores 91 and 92 are annular end walls 93 and 94, respectively, each of which has a central opening through which the shaft 87, connecting the pistons 88 and 89, extends. Suitably fixed to the inner face of the annular end walls 93 and 94 are annular gasket seats 95 and 96, respectively, on which the pistons 88 and 89 are adapted to seat. The annular end walls 93 and 94 thus establish the extreme positions of the pistons 88 and 89, the end wall 93 being engaged by the piston 88 upon shifting of the pistons in the right-hand direction and the end wall 94 being engaged by the piston 89 upon shifting of the pistons in the left-hand direction from the central or neutral position shown.

Detachably secured to the main part of the casing of the control switch mechanism 18 is a casing section 101 having a bore 102 coaxially arranged with respect to the bore 91 and in which a piston 103 operates. The piston 103 has a stem 104 which projects through a central opening in a wall 105 at the inner end of the casing section 101, and an annular gasket 106, secured on the end wall 105, provides a seat on which the piston 103 seats upon the supply of fluid under pressure to a chamber 107 formed between the piston 103 and a cover 108 at the outer end of the casing section 101.

The location of the end wall 105 and the length of the stem 104 of the piston 103 is such that, when the piston 103 is seated on the gasket seat 106, the stem 104 engages the piston 88 and shifts the pistons 88 and 89, together with the fulcrum roller 52, to a predetermined position, such as the position shown in the drawing, against the yielding opposition of a coil spring 109 acting through the medium of a stop element 110 on the outer face of the piston 89.

Formed between the piston 88 and the wall 105 is a chamber 111 adapted to be charged with fluid at different pressures. When the fluid pressure in chamber 111 is increased from atmospheric pressure, the pistons 88 and 89 and thus fulcrum 52 are shifted in the right-hand direction against the resistance of the spring 109 a distance proportional to the pressure until the piston 88 seats on the gasket seat 95. When the pressure in the chamber 111 is reduced toward atmospheric pressure, the spring 109 shifts the pistons 88 and 89 and fulcrum 52 in a reverse direction in accordance with the reduction in pressure until the piston 88 reengages the end of the stem 104 of the piston 103. If the chamber 107 is charged with fluid under pressure, the spring 109 is ineffective to shift the pistons 88 and 89 further in the left-hand direction. If the chamber 107 is vented to atmosphere, the spring 109 is effective to continue to shift the pistons 88 and 89 further in the left-hand direction until the piston 89 seats on the gasket seat 96.

As will be made clear presently, the supply and the release of fluid under pressure to and from the chamber 111 is effected under the control of the self-lapping valve device 19, and the supply and the release of fluid under pressure to and from the chamber 107 is under the control of the cut-off magnet valve device 21.

The self-lapping magnet valve device 19 comprises a suitable casing containing a supply valve 115, a release valve 116, and an electro-magnet winding 117 for effecting operation of the valves 115 and 116. The supply valve 115 is contained in a chamber 118, which is connected to the main reservoir pipe 26 as through a branch pipe 119, and is normally yieldingly urged into seated relation on an associated valve seat by a coil spring 121.

The release valve 116, which may be formed integral with the supply valve 115 in the manner shown, is contained in a chamber 122 that is constantly connected to the chamber 111 of the control switch mechanism 18 by a pipe 123.

A flexible diaphragm 125 is suitably secured in the casing and has a chamber 126 at one side thereof which is open to the atmosphere through an exhaust port 127, and at the opposite side thereof a chamber 128 which is connected to the chamber 122 through a restricted port or passage 129.

The diaphragm 125 has a central opening in which a cylindrical sleeve or bushing 131 is secured. The sleeve 131 has a port 132 at the lower end thereof and, surrounding the port 132, a valve seat 133 on which the release valve 132 is adapted to seat. When the release valve 116 is unseated from the valve seat 133 on the sleeve 131, communication is established between the chamber 122 and the connected chamber 111 of the control switch mechanism 18 through a hollow central passage in sleeve 131 to the chamber 126 and thus through the exhaust port 127 to atmosphere.

Associated with the electro-magnet winding 117 is a plunger 135 to which is secured a valve operating stem 136. Secured to the upper end of the stem 136 is a collar 137 and interposed between collar 137 and another collar 138, fixed in the casing of the self-lapping magnet valve device 19, is a lightly tensioned coil spring 139 which acts to shift the stem 136 and plunger 135 upwardly to a normal position when the electro-magnet winding 117 is deenergized.

Interposed between the lower end of the stem 136 and a lug 141 on the interior of the sleeve 131 is a floating stem 142. When the electro-magnet winding 117 is deenergized and stem 136 is accordingly raised to its uppermost position, the inherent resiliency of the diaphragm 125 raises the sleeve 131 to a position such that the release valve 116 is unseated and thus simultaneously causes the spring 121 to seat the supply valve 115. When the electro-magnet winding 117 is energized, the stem 136 is shifted downwardly with the plunger 135 and engages the floating stem 142 to cause it to actuate the sleeve 131 and diaphragm 125 downwardly. In moving downwardly, the sleeve 131 on the diaphragm 125 first engages the release valve 116 to close the exhaust communication for the chamber 111 through the port 132 and then unseats the supply valve 115 against the yielding resistance of the spring 121. With the supply valve 115 unseated, communication is established from the main reservoir pipe 26 to the chamber 111 by way of the branch pipe 119, chambers 118 and 122, and pipe 123.

As pressure of the fluid builds up in the chamber 111 and the chamber 122, the pressure in the chamber 128 at the lower side of the diaphragm 125 is correspondingly built up through the restricted passage 129. When the force of the fluid under pressure in the chamber 128, urging the diaphragm 125 upwardly, slightly exceeds the force exerted downwardly due to energization of the electro-magnet winding 117, sleeve 131 is shifted upwardly, the spring 121 maintaining the release valve 116 seated on the associated valve seat 133. Upon sufficient upward movement of the diaphragm 125 and sleeve 131, the supply valve 115 is reseated to close off the further supply of fluid under pressure to the chamber 111 and thus further upward movement of the diaphragm and sleeve 131 is immediately stopped so that both the supply valve 115 and the release valve 116 are seated to lap the supply of fluid under pressure to chamber 111

If the degree of energization, that is, the exciting current for the electro-magnet 117 is increased, the upward force of the fluid pressure in the chamber 128 is overcome and, consequently, the sleeve 131 is again shifted downwardly to unseat the supply valve 115 and thus cause fluid under pressure to be again supplied to the chamber 111 to further increase the pressure therein. As in the previous case, when the pressure in the chamber 111 and thus the pressure in the chamber 128 at the lower side of the diaphragm 125 is such as to exert an upward force on the diaphragm slightly exceeding the force exerted downwardly thereon due to the energization of the magnet winding 117, the sleeve 131 is again shifted upwardly clearly sufficiently to reseat the supply valve 115 without unseating the release valve 116.

It will thus be apparent that the self-lapping magnet valve device 19 operates to establish a pressure in the chamber 111 of the control switch mechanism 18 which is proportional to the energizing current of the electro-magnet winding 117.

The cut-off magnet valve device 21 comprises a casing containing a pair of oppositely seating valves 145 and 146, hereinafter designated the supply valve and release valve, respectively, and an electro-magnet winding 147 which is effective, when energized, to actuate a plunger or stem 148 to shift the valves 145 and 146 to seated and unseated positions, respectively, against the yielding resistance of a spring 149. The supply valve 145 is contained in a chamber 151 which is connected to the main reservoir pipe 26, as through a branch pipe 152 of the pipe 119. Release valve 146 is contained in a chamber 153 which is constantly open to atmosphere through an exhaust port 154.

Located between the chambers 151 and 153 is a chamber 155 within which the fluted stems of the supply and release valves 145 and 146 meet in end-to-end contact, chamber 155 being constantly connected to the chamber 107 of the control switch mechanism 18 through a pipe 157.

When the electro-magnet 147 of the cut-off magnet valve device 21 is deenergized, the spring 149 acting on the release valve 146 urges the supply valve 145 and the release valve 146 to unseated and seated positions, respectively. The release valve 146, when seated, cuts off communication between the chamber 155 and the atmospheric chamber 153 and the supply valve 145, when unseated, establishes communication from the chamber 155 and the connected chamber 107 of the control switch mechanism 18 to the chamber 151 and the connected main reservoir pipe 26, thereby causing the chamber 107 to be charged with fluid under pressure from the main reservoir pipe 26.

When the electro-magnet 147 is energized and the valves 145 and 146 correspondingly shifted to seated and unseated positions, respectively, the seated supply valve 145 cuts off the communication between the main reservoir pipe 26 and the chamber 107 and the release valve 146 opens communication from the chamber 107 to the atmospheric chamber 153 to cause the fluid in the chamber 107 to be vented to atmosphere.

The governor rheostat device 22 comprises a rheostat device 161, a centrifuge device 162 for operating the rheostat device 161, and a clutch device 163 for controlling the rotative connection between the centrifuge device 162 and a shaft or rod 164 which is rotated in any suitable manner according to the speed of the vehicle, as by connection to a wheel-axle of the vehicle.

The rheostat device 161 comprises a resistor 166 which is provided with a series of tap connections and tap contact members 167 adapted to be engaged and disengaged in succession by a movable contact member 168. For purposes of illustration, the contact member 168 is shown as carried in insulated relation on a lever 169 which is pivoted at one end on a fixed part of a vehicle frame or of the casing of the governor device 22 and pivoted through an arc by operation of the centrifuge device 162 in the manner to be presently described.

The centrifuge device 162 comprises a rotary element 171, which is suitably journaled in the casing of the device 22 and on which are carried a plurality of pivoted levers 172 that are weighted at the outer end as by fly-balls 173. When the rotary element 171 is rotated, the fly-balls 173 move outwardly and cause the inner end of the levers 172 to exert an upward force on the lower face of a flange or collar 174 fixed to a stem 175, thereby causing the stem 175 to move upwardly against the yielding resistance of a coil spring 176 that is interposed between the flange 174 and the casing of the device 22. The stem 175 is suitably journaled in the wall of the casing and extends to the exterior of the casing. The outer end of the stem 175 is bifurcated to straddle the lever 169 carrying the movable contact member 168 of the rheostat device 161 and is pivotally connected to the lever 169, as by a pin 177 which extends through an elongated slot in the lever 169.

The rotary element 171 of the centrifuge device 162 is releasably connected to the shaft 164 by the clutch device 163. The clutch device 163 may comprise a clutch element or disc 181 having a hub whereby it is suitably journaled in the casing of the device 22, the hub having fixed thereon a bevel gear 182 which meshes with another bevel gear 183 fixed on the shaft 164. The clutch device 163 may further comprise another clutch member 184 having an element 185 of suitable friction material fixed in the face thereof adapted to engage the face of the clutch disc 181 in frictional relation to cause rotation of the clutch member 184 corresponding to the rotation of the clutch disc 181.

The clutch member 184 includes a stem 186 which is coaxial to the hub of the member 184 and which is provided at the outer end thereof with a squared portion 187 that is slidably received in a corresponding recess formed in the hub portion of the rotary element 171 of the centrifuge device 162. Thus the rotary element 171 and the clutch member 184 rotate together at all times notwithstanding movement of the clutch member 184 into and out of engagement with the clutch disc 181.

The clutch member 184 is shifted into or out of engagement with the clutch disc 181 by means of a piston 189 and a lever 191. The lever 191 is pivoted at one end on the casing of the device 22 and has a yoke 192 formed thereon which straddles a reduced portion on the hub of the clutch member 184, the other end of the lever 191 being pivotally connected to a stem 193 of the piston 189. At one side of the piston 189 is a chamber 195 which is constantly connected to the straight-air pipe 15, as through a branch pipe 196. Interposed between the opposite side of the piston 189 and the casing of the device 22, is a coil spring 197 which yieldingly urges the piston upwardly to shift the free end of the lever 191 correspondingly upward and effect disengagement of the clutch member 184 from the clutch disc 181. When the pressure of the fluid supplied to the chamber 195 exceeds a certain low pressure, such as two or three pounds per square inch, sufficient to overcome the spring 197, the piston 189 is actuated downwardly thus causing the lever 191 to shift the clutch member 184 into frictional engagement with the clutch disc 181 to establish a driving connection between the shaft 164 and the rotary member 171 of the centrifuge device 162.

The control circuits whereby the governor rheostat device 22 controls the self-lapping magnet valve device 19 and the cut-off magnet valve device 21 should be apparent from the drawing. The movable contact member 168 of the rheostat device 161 is connected to the positive terminal of the battery 23, as by the wire 75 and a branch wire 75a including a flexible portion. One end of the resistor 166 is connected by a wire 199 to one terminal of the electro-magnet winding 117 of the self-lapping magnet valve device 19 and one terminal of the electro-magnet winding 147 of cut-off magnet valve device 21. The remaining terminals of the electro-magnets 117 and 147 are connected to the negative terminal of the battery 23, as through a ground connection in the manner indicated. Thus, when the contact member 168 engages the initial end tap contact member 167 and the succeeding tap contact members 167, the circuit is completed for energizing both the electro-magnet windings 117 and 147, the degree of energization of the electro-magnet windings depending upon the position of the lever 169, as determined by the speed of rotation of the centrifuge device 162, and the corresponding amount of the resistor 166 cut in the circuit.

OPERATION OF EQUIPMENT (a) *Charging of equipment*

With the main reservoir 12 charged to its normal pressure, as from a fluid compressor in the usual manner, the main reservoir pipe 26 and the connected chamber 33 of the application magnet valve device 16 are charged to a corresponding pressure. Assuming that the brake valve handle 25 is in release position and that the straight-air pipe 15 and brake cylinder 11 are correspondingly at atmospheric pressure, chamber 195 at one side of the clutch actuating piston 189 is also at atmospheric pressure and consequently, the clutch member 184 is disengaged from the clutch disc 181. The rotary element 171 of the centrifuge device 162 is thus stationary and the spring 176 accordingly actuates the stem 175 downwardly to its lowermost position in which the movable contact member 168 on the lever 169 is disengaged from the end tap contact member 167 of the resistor 166. The circuit for energizing the electro-magnet windings 117 and 147 of the self-lapping magnet valve device 19 and the cut-off magnet valve device 21, respectively, is thus interrupted and devices 19 and 21 positioned as shown in the drawing. The chamber 111 of the control switch mechanism 18 is thus vented to atmosphere under the control of the self-lapping magnet valve device 19 and the chamber 107 is charged with fluid under pressure from the main reservoir pipe 26 under the control of the cut-off magnet valve device 21. With chamber 107 charged with fluid under pressure fulcrum 52 is shifted to the normal position thereof as shown in the drawing.

(b) *Application of the brakes*

If the vehicle or train is traveling along the road at a relatively high speed and an application of the brakes is desired, the operator operates the brake valve device 13 to establish a pressure in the control pipe 14 corresponding to the desired degree of application of the brakes. For purposes of illustration let it be supposed that the operator effects a service application of the brakes and establishes a pressure of seventy-five pounds per square inch in the control pipe 14.

Upon the supply of fluid under pressure to pipe 14 and the connected chamber 53 of the control switch mechanism 18, the lever 51 is pivoted in a clockwise direction on the fulcrum roller 52 so that the contact-bridging member 62 is shifted downwardly out of engagement with the contact members 66 and into engagement with the contact member 67. The release magnet valve device 17 is thus deenergized and the application magnet valve device 16 energized in succession and fluid under pressure is accordingly supplied from the main reservoir pipe 26 to the straight-air pipe 15 and the brake cylinder 11.

When the pressure in the straight-air pipe 15 and the connected chamber 195 of the governor device 22 exceeds a relatively low pressure, such as two or three pounds per square inch, sufficient to effect engagement of the clutch members 184 and 181, the rotary element 171 of the centrifuge device 162 is connected to the shaft 164 and then rotates at a speed corresponding to the speed of the vehicle or train.

Since the vehicle or train is traveling at a relatively high speed, the lever 169 and the movable contact member 168 is correspondingly positioned so as to cut out the major portion of the resistor 166 and thus cause the electro-magnet windings 117 and 147 of the self-lapping magnet valve device 19 and cut-off magnet valve device 21 to be energized by a relatively high current.

Chamber 111 of the control switch mechanism 18 is thus charged to a fluid pressure corresponding in degree to the speed of the vehicle or train at the time the application of the brakes is initiated, and magnet valve device 21 is operated to vent the chamber 107 at the left of the piston 103 to atmosphere through port 154.

Assuming that the pressure of the fluid established in the chamber 111 is sufficient to shift the piston 88 in the right-hand direction into seated relation on the gasket seat 95, fulcrum roller 52 will be correspondingly shifted to an extreme position in the right-hand direction. For purposes of illustration let it be assumed that the extreme right-hand position of the fulcrum roller 52 is such as to provide a ratio of four-to-one between the moment arm of the stem 55 and the moment arm of stem 59.

It will be apparent that, in such case, the contact member 62 will be maintained in engagement with the contact members 67 to cause fluid under pressure to be supplied to the straight-air pipe 15 and brake cylinder 11 until the pressure in the straight-air pipe and brake cylinder is substantially four times the pressure established in the control pipe 14, the diaphragms 54 and 58 being assumed to have the same effective pressure areas. When the stem 59 and the contact member 62 are shifted upwardly in response to the increase of the pressure in the straight-air pipe 15 and the chamber 57, contact member 62 disengages the contact members 67 to cause deenergization of the release magnet valve device 17 and the consequent cut-off of further supply of fluid under pressure to the straight-air pipe 15 and brake cylinder 11. Further upward movement of the stem 59 and contact member 62 is stopped before the contact member 62 reengages the contact members 66 and, thus, both the application and release magnet valve devices 16 and 17 remain deenergized to lap the supply of fluid under pressure to the straight-air pipe 15 and brake cylinder 11.

If the extreme right-hand position of the fulcrum roller 52 is such as to establish a ratio of four-to-one between the pressure in the straight-air pipe 15 and the pressure in control pipe 14, it will be seen that a pressure of three hundred pounds per square inch will be established in the straight-air pipe and brake cylinder, with a pressure of seventy-five pounds per square inch established in the control pipe 14.

As the speed of the vehicle or train diminishes, the movable contact member 168 of the rheostat 161 is correspondingly adjusted to cut in successively greater amounts of the resistor 166 to cause a corresponding reduction in the energizing current for the electro-magnet windings 117 and 147 of the self-lapping magnet valve device 19 and the cut-off magnet valve device 21.

The self-lapping magnet valve device 19 operates, in the manner previously indicated, to correspondingly reduce the pressure in the chamber 111 of the control switch mechanism as the speed of the vehicle reduces. The spring 109 thus acts to shift the pistons 88 and 89 back toward the original position shown in the drawing, the position of the fulcrum roller 52 corresponding at any particular instant to the pressure in the chamber 111.

As the fulcrum roller 52 moves back toward its central or neutral position shown in the drawing, the ratio between the moment arm of the stem 55 and the moment arm of the stem 59 decreases and thus the pressure in the straight-air pipe 15 and chamber 57 is effective to exert a moment of force on the pivoted lever 51 which overbalances the moment exerted by the pressure of the fluid in the control pipe 14 and chamber 53. The lever 51 is accordingly pivoted in a counterclockwise direction and reengagement of the contact member 62 with the contact members 66 effected. Thereupon, the release magnet valve device 17 is energized and the release valve 39 unseated to effect the release of fluid under pressure from the straight-air pipe 15 and brake cylinder 11.

When the pressure in the straight-air pipe 15 and brake cylinder 11 reduces sufficiently that the moment of force exerted on the lever 51 by the pressure of fluid in the control pipe 14 and chamber 53 slightly exceeds the moment of force exerted by the straight-air pipe pressure acting in chamber 57, the lever 51 is pivoted in a clockwise direction sufficiently to cause disengagement of the contact member 62 from the contact members 66. The release magnet valve device 17 is thus immediately deenergized and the release valve 39 reseated to cut off the further release of fluid under pressure from the straight-air pipe 15 and brake cylinder 11. Since the release of fluid under pressure from the straight-air pipe 15 is cut off, further downward movement of the stem 59 is stopped and thus the contact member 62 pauses midway between and out of engagement with the two sets of contact members 66 and 67 so that the supply of pressure to the straight-air pipe 15 and brake cylinder 11 is lapped.

It will be apparent that since the speed of the vehicle or train is constantly reducing due to the application of the brakes, the pressure in the chamber 111 of the control switch mechanism 18 will be also proportionately reducing so that the fulcrum roller 52 will also correspondingly move toward the left-hand direction to effect corresponding reduction in the pressure in the straight-air pipe 15 and brake cylinder 11 according to the reduction in the ratio between the control pipe pressure and straight-air pipe pressure as determined by the position of the fulcrum roller.

The electro-magnet 147 of the cut-off magnet valve device 21 is so designed that as long as the movable contact member 168 engages any of the tap contact members 167 of the resistor 166, it continues effective to actuate the valves 145 and 146 to seated and unseated positions, respectively, so as to maintain the chamber 107 of the control switch mechanism 18 vented to atmosphere. The contact member 168 of the rheostat device 161 does not disengage the end contact member 167 of the resistor 166 until the vehicle or train comes to a complete stop and thus it will be seen that the chamber 107 remains vented to atmosphere until the vehicle comes to a complete stop.

Accordingly, as the pressure in the chamber 111 is reduced under the control of the self-lapping magnet valve device 19, the piston 103 is ineffective to oppose movement of the pistons 88 and 89 when, due to the reduction of the pressure in the chamber 111, spring 109 shifts the pistons 88 and 89 sufficiently in the left-hand direction to cause the piston 88 to engage the end of the stem 104 of the piston 103.

Upon a sufficient reduction of the pressure in the chamber 111 in proportion to the reducing speed of the vehicle, the spring 109 is thus effective to continue to shift the pistons 88 and 89 in the left-hand direction until the piston 89 seats on the gasket seat 96, which determines the extreme left-hand position of the pistons and the fulcrum roller 52.

The gasket seat 96 may be located as desired to establish any selected minimum ratio between the moment arm of the stem 55 and the moment arm of stem 59. Assuming, for example, that the extreme left-hand position of the fulcrum roller 52 is such that the moment arm of the stems 55 and 59 are in the ratio of two-to-three, it will be apparent that the pressure in the straight-air pipe 15 and brake cylinder 11 will be automatically reduced, due to the shifting of the fulcrum roller 52, to a minimum pressure which is two-thirds of the pressure established in the control pipe 14. Assuming a pressure of seventy-five pounds per square inch to be established in the control pipe 14, it will be seen that the minimum pressure thus established in the straight-air pipe 15 will be fifty pounds per square inch.

When the vehicle is completely stopped and the movable contact member 168 disengages the end tap contact member 167 of the resistor 166, the circuit for energizing the electro-magnet windings 117 and 147 of the self-lapping magnet valve device 19 and the cut-off magnet valve device 21 is interrupted and, thus, the pressure in the chamber 111 is reduced to atmospheric pressure and the chamber 107 is again charged with fluid under pressure from the main reservoir pipe 26. When the pressure in the chamber 107 increases sufficiently, the piston 103 is shifted in the right-hand direction to cause the pistons 88 and 89 to be shifted in the right-hand direction against the opposing resistance of the spring 109. When the maximum pressure is established in the chamber 107, the piston 103 is shifted into seated engagement on the gasket seat 106 and thus the pistons 88 and 89 are again positioned, as shown in the drawing, with the fulcrum roller 52 in its central position midway between the stems 55 and 59.

Thereupon, since the moment on the lever 51 in a clockwise direction exerted by the pressure of fluid in the control pipe 14 exceeds the moment in a counter-clockwise direction exerted by the straight-air pipe pressure, the contact member 62 is again shifted downwardly into engagement with the contact members 67 to effect energization of the application magnet valve device 16 and a consequent increase in the pressure in straight-air pipe 15 and brake cylinder 11 corresponding to the position of the fulcrum roller 52. With the fulcrum roller 52 midway between the stems 55 and 59, it will be apparent that the moment arms of the stems are equal and thus the supply of pressure in the straight-air pipe 15 and brake cylinder 11 will be lapped when the pressure in the straight-air pipe 15 is increased substantially to the pressure established in the control pipe 14, which in the case assumed, is seventy-five pounds per square inch.

It will thus be seen that when the vehicle comes to a complete stop, the brake cylinder pressure is automatically increased to a desired ratio, such as a one-to-one ratio, with the pressure established in the control pipe 14.

It will be apparent that the operator retains control of the brakes at all times and that he may operate the brake valve device 13 to vary the pressure in the control pipe 14 and, correspondingly, the pressure in the straight-air pipe 15 and brake cylinder 11. Thus, when the vehicle comes to a complete stop on a grade, the operator may increase the pressure in the control pipe 14 to any desired degree so as to provide adequate brake cylinder pressure to hold the vehicle or train on the grade against creepage.

If the vehicle or train is traveling at an intermediate speed at the time the application of the brakes is initiated, it will be apparent that the pressure in the chamber 111 of the control switch mechanism 18 is correspondingly less than in the previously described instance, and that, therefore, the initial ratio between the pressure established in the straight-air pipe and brake cylinder and the control pipe pressure will be correspondingly less. The ratio between the straight-air pipe pressure and the control pipe pressure will, as in the previous case, be decreased subsequently according to the reduction in the speed of the vehicle during the application of the brakes.

In the event of a failure of the control circuit for the self-lapping magnet valve device 19 and cut-off magnet valve device 21, as by breakage or ground fault, the fulcrum roller 52 remains in the position shown in the drawing. Thus, an adequate ratio between the pressure in the straight-air pipe 15 and in the control pipe 14 is maintained to enable the application of the brakes to a sufficient degree to insure safe stopping of the vehicle or train.

It will be apparent that with the electromagnet 147 of cut-off magnet valve device 21 deenergized, the chamber 107 of the control switch mechanism 18 is immediately charged with fluid under pressure from main reservoir pipe 26 and thus, notwithstanding the loss of pressure in the chamber 111 due to the deenergization of the electro-magnet winding 117 of self-lapping magnet valve device 19, the spring 109 is unable to shift the pistons 88 and 89 beyond the position shown in the drawing wherein the fulcrum roller 52 is positioned as desired, such as midway between the stem 55 and 59.

SUMMARY

Summarizing, it will be seen that I have provided an equipment adapted to control applications of the brakes on a vehicle or train automatically according to the speed of travel thereof. The equipment includes a fluid-pressure-differential responsive device including a pivoted lever, subject to the opposing moments of a control pressure and a supply pressure and operative to control the degree of the supply pressure in varying ratio to the control pressure dependent upon the position of a movable fulcrum of a pivoted lever.

The position of the movable fulcrum corresponds to that of a movable abutment which is shiftable between extreme positions in opposite directions according to variations in fluid pressure acting on the abutment. A self-lapping magnet valve device, controlled according to the speed of the vehicle, controls the pressure acting on the abutment according to the speed of the vehicle.

An additional abutment is adapted to be subject to fluid under pressure to automatically shift the first mentioned abutment and thus the fulcrum roller of the pivoted lever to a certain uniform position sufficient to provide adequate braking for the vehicle at all times when the vehicle comes to a stop and, in emergencies, upon failure, as by breakage, of electrical control circuits.

A feature of my invention is a governor-operated rheostat device having a clutch arrangement whereby the device is non-operative except upon applications of the brakes. The need for servicing and service expense is minimized and the life of the governor rheostat device extended due to the minimum time the device is in use.

While I have illustrated and described a brake equipment including only one brake cylinder, it will be apparent to those skilled in the art that various omissions, additions or modifications may be made in the equipment shown, without departing from the spirit of my invention, in order to adapt the equipment to the control of a complete brake system for a train of cars. It is, therefore, not my intention to limit the scope of my invention except as it is necessitated by the scope of the prior art.

Having now described my invention, what I claim as new and desire to secure by Letters Patent, is:

1. In a vehicle brake system, brake control means including a pivoted lever subject to the opposing moments exerted by a control pressure and a supply pressure which determines the degree of application of the brakes, a fulcrum for said lever movable to different positions to vary the ratio between the control pressure and the supply pressure, means providing a chamber adapted to be charged with fluid at different pressures, a movable abutment shiftable to different positions according to the pressure in said chamber for causing a corresponding shifting of the said fulcrum, and a variably excited current-responsive device for causing variation in the pressure in said chamber corresponding to variation in the exciting current thereof.

2. In a vehicle brake system, brake control means including a pivoted lever subject to the opposing moments exerted by a control pressure and a supply pressure which determines the degree of application of the brakes, a fulcrum for said lever movable to different positions to vary the ratio between the control pressure and the supply pressure, means providing a chamber adapted to be charged with fluid at different pressures, a movable abutment shiftable to different positions according to the pressure in said chamber for causing a corresponding shifting of the said fulcrum, and a self-lapping magnet valve device for controlling the pressure in the said chamber.

3. In a vehicle brake system, brake control means including a pivoted lever subject to the opposing moments exerted by a control pressure and a supply pressure which determines the degree of application of the brakes, a fulcrum for said lever movable to different positions to vary the ratio between the control pressure and the supply pressure, means providing a chamber adapted to be charged with fluid at different pressures, a movable abutment shiftable to different positions according to the pressure in said chamber for causing a corresponding shifting of the said fulcrum, a variably excited current-responsive device for causing variation in the pressure in said chamber corresponding to variation in the exciting current thereof, and means controlled according to a variable operating condition of the vehicle for controlling the degree of the exciting current for said current-responsive device.

4. In a vehicle brake system, brake control means including a pivoted lever subject to the opposing moments exerted by a control pressure and a supply pressure which determines the degree of application of the brakes, a fulcrum for said lever movable to different positions to vary the ratio between the control pressure and the supply pressure, means providing a chamber adapted to be charged with fluid at different pressures, a movable abutment shiftable to different positions according to the pressure in said chamber for causing a corresponding shifting of the said fulcrum, a self-lapping magnet valve device for controlling the pressure in the said chamber, and means conditioned according to a variable operating condition of the vehicle for controlling the said self-lapping magnet valve device.

5. In a vehicle brake system, means for effecting an application of the brakes, means controlled according to a variable operating condition of the vehicle for automatically diminishing the braking force with which the application of the brakes is effected to a certain minimum degree during the application of the brakes, and means effective when the motion of the vehicle stops for automatically effecting an increase in the braking force to a degree higher than said certain minimum degree.

6. In a vehicle brake system, self-lapping means including a pivoted lever for controlling the degree of braking force with which the application of the brakes is effected, a movable fulcrum for said lever having a certain normal position and adapted when shifted in one direction from said normal position to effect a reduction in the degree of braking force, means controlled according to the speed of the vehicle for causing said fulcrum to be shifted in the said one direction as the speed of the vehicle reduces, and means operative when the motion of the vehicle is stopped for automatically causing the said fulcrum to be shifted to its normal position.

7. In a vehicle brake system, self-lapping means including a pivoted lever for controlling the degree of braking force with which application of the brakes is effected, a movable fulcrum for said lever having a certain normal position and so arranged that when shifted in one direction from said normal position the self-lapping means is conditioned to operate to establish a lower degree of braking force, electro-pneumatically controlled means for causing the said fulcrum to be moved in the said one direction from its normal position, and means effective when the motion of the vehicle is stopped for rendering the electro-pneumatically controlled means ineffective to shift the said fulcrum in the said one direction from its normal position.

8. In a vehicle brake system, self-lapping means including a pivoted lever for controlling the degree of braking force with which the application of the brakes is effected, a movable fulcrum for said lever having a certain normal position, means including electro-responsive means effective during an application of the brakes to cause the said fulcrum to move in one direction from said normal position to cause the self-lapping means to operate to effect a reduction in the braking force, and means effective upon the failure of the operating circuit of the electro-responsive means, for causing the said fulcrum to be returned to its normal position.

9. In a vehicle brake system, in combination, means for establishing a control fluid pressure, fluid pressure operated self-lapping switch means operably responsive to said control pressure for establishing a brake applying pressure, and electroresponsive means having the degree of energization thereof progressively varied in response and according to variations in a variable operating condition of the vehicle for controlling the ratio between said two pressures.

10. In a vehicle brake system, in combination, means for establishing a control fluid pressure, switch means operably responsive to said control pressure for establishing a brake applying pressure, and electroresponsive means having the degree of energization thereof progressively varied in response and according to variations in the speed of the vehicle for varying the ratio between said two pressures.

DONALD L. McNEAL.